United States Patent
Handschke (10) Patent No.: US 10,751,825 B2
(45) Date of Patent: Aug. 25, 2020

(54) ENGINE-DRIVEN WELDING-TYPE POWER SUPPLIES WITH PORTABLE WELDING UNITS

(71) Applicant: ILLINOIS TOOL WORKS INC., Glenview, IL (US)

(72) Inventor: Michael J. Handschke, Appleton, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 689 days.

(21) Appl. No.: 15/337,267

(22) Filed: Oct. 28, 2016

(65) Prior Publication Data
US 2018/0117697 A1    May 3, 2018

(51) Int. Cl.
*B23K 9/10* (2006.01)
*B23K 9/173* (2006.01)
*B23K 9/133* (2006.01)
*B23K 9/32* (2006.01)

(52) U.S. Cl.
CPC .......... *B23K 9/1006* (2013.01); *B23K 9/1087* (2013.01); *B23K 9/133* (2013.01); *B23K 9/173* (2013.01); *B23K 9/32* (2013.01)

(58) Field of Classification Search
CPC ......... B23K 9/1006; B23K 9/32; B23K 9/133
USPC .......................... 219/130.1, 133, 134, 137 PS
See application file for complete search history.

(56) References Cited

U.S. PATENT DOCUMENTS

| | | | |
|---|---|---|---|
| 2,618,775 A * | 11/1952 | Shay | B23K 9/1087 |
| | | | 219/133 |
| 6,348,671 B1 | 2/2002 | Fosbinder | |
| 6,818,860 B1 * | 11/2004 | Stava | B23K 9/1006 |
| | | | 219/130.1 |
| 8,785,817 B2 | 7/2014 | Luck | |
| 2005/0224478 A1 | 10/2005 | Stropki | |
| 2006/0124620 A1 * | 6/2006 | Diekmann | B23K 9/1006 |
| | | | 219/130.1 |
| 2010/0060015 A1 * | 3/2010 | Buker | F02B 63/04 |
| | | | 290/1 R |

(Continued)

FOREIGN PATENT DOCUMENTS

DE        9401171        6/1994

OTHER PUBLICATIONS

PipePro 304, Owner's Manual, Miller The Power of Blue, OM-492 Feb. 2001 (64 pages).

(Continued)

*Primary Examiner* — Thien S Tran
(74) *Attorney, Agent, or Firm* — McAndrews, Held & Malloy, Ltd.

(57) ABSTRACT

Engine-driven welding-type power supplies with portable welding units are disclosed. An example engine driven welder includes an engine, a generator configured to convert mechanical power from the engine to electric power, a chassis, the engine and the generator being mounted to the chassis, and a welding power supply configured to receive the electric power from the generator and convert the electric power to welding-type power, wherein the chassis is configured to physically hold the welding power supply, the welding power supply is physically separable from the chassis, and the welding power supply is connected to be able to receive the electric power when the welding power supply is separated from the chassis and when the welding power supply is connected to the chassis.

20 Claims, 5 Drawing Sheets

(56) References Cited

U.S. PATENT DOCUMENTS

| | | | |
|---|---|---|---|
| 2011/0017717 A1* | 1/2011 | Farah | B23K 9/1006 |
| | | | 219/133 |
| 2011/0073569 A1* | 3/2011 | Rappl | B23K 9/095 |
| | | | 219/73.2 |
| 2011/0220616 A1* | 9/2011 | Mehn | B23K 9/291 |
| | | | 219/74 |
| 2011/0309053 A1 | 12/2011 | Baus | |
| 2014/0376186 A1* | 12/2014 | Sigl | B23K 9/32 |
| | | | 361/695 |
| 2016/0098051 A1 | 4/2016 | Enyedy | |
| 2017/0036291 A1* | 2/2017 | Enyedy | B23K 9/1043 |

OTHER PUBLICATIONS

Field Instructions for Dual Power Kit 195 275 in PipePro 304 Models Effective with Serial No. LC649059 and Following, Form: F216 358B, Mar. 2007, Miller Electric Mfg. Co., 2007, (9 pages).
Int'l Search Report and Written Opinion Appln No. PCT/US017/058700, dated Feb. 21, 2018 (13 pgs).

\* cited by examiner

ENGINE-DRIVEN WELDING-TYPE POWER SUPPLIES WITH PORTABLE WELDING UNITS

BACKGROUND

Conventional engine-driven welding-type power supplies are heavy and cumbersome to move due to the weight of the engine and the generator. While conventional engine-driven welding-type power supplies are often put on a rolling cart to improve the portability, the weight of the device is still an issue for, for instance, loading and unloading onto a truck or moving from a truck to a work site. On a work site, an operator must move the entire engine-driven welding-type power supply to the location of the welding work to be done or, if within a certain range, use long weld cables that results in lower efficiency and higher probability of cable damage.

SUMMARY

Engine-driven welding-type power supplies with portable welding units are disclosed, substantially as illustrated by and described in connection with at least one of the figures, as set forth more completely in the claims.

DETAILED DESCRIPTION

Disclosed examples provide an operator (e.g., welder) the ability to use the welding machine in a traditional configuration (e.g., the engine, the generator, the fuel tank, and the controls combined as one device) and to remove the weld module from the engine, the generator, the fuel tank assembly and move the weld module to a remote area to weld.

Disclosed examples relieve the user from the requirement of having to pick up or drag the entire unit, which is typically too heavy for one person and can be difficult or cumbersome for two people to move. Disclosed examples locate the weld controls proximate to the operator instead of at the location of the engine and generator, which can be a substantial distance from the site of the weld operation when a long weld cable is used. Disclosed example enable the operator to use weld cables that are shorter and/or have smaller diameters than with conventional engine-driven welders. Thus, disclosed examples improve mobility of the welder, reduces or prevents cable tangling, and/or increases worksite safety.

Welding-type power, as used herein, refers to power suitable for welding, plasma cutting, induction heating, air carbon-arc cutting and/or gouging (CAC-A), cladding, and/or hot wire welding/preheating (including laser welding and laser cladding).

As used herein, the term "portable welding unit" refers to a device having a net and/or gross weight of less than 51 pounds (e.g., 22.68 kilograms) and, more preferably, a net and/or gross weight of less than 31 pounds (e.g., 13.61 kilograms). Portable welding units may include one or more mechanisms for carrying or otherwise conveying the portable welding unit (e.g., handles). As used herein, the term "net weight" of a welding power supply includes the chassis of the welding power supply and any components within the chassis, and does not include the weight of a connected power cord or cable connected between the welding power supply and the power source, does not include the weight of a connected work cable, does not include the weight of a connected weld gun and/or weld cable, and does not include the weight of a wire spool installed in the welding power supply.

As used herein, the term "engine driven welder" refers to a welding power supply that is powered by an engine and a generator. Example engines are internal combustion engines.

Disclosed example engine-driven welders include an engine, a generator configured to convert mechanical power from the engine to electric power, a chassis, and a welding power supply. The engine and the generator are mounted to the chassis. The welding power supply receives the electric power from the generator and converts the electric power to welding-type power. The chassis is configured to physically hold the welding power supply, and the welding power supply is physically separable from the chassis. The welding power supply is connected to be able to receive the electric power when the welding power supply is separated from the chassis and when the welding power supply is connected to the chassis.

In some examples, the welding power supply is coupled to a winding of the generator, via a cable, to receive alternating current. In some such examples, the chassis includes a cable management device to hold the cable. In some such examples, the cable management device comprises at least one of a cable reel or a cable winder.

In some example engine-driven welders the welding power supply includes an auxiliary power converter to convert the electric power to at least one of direct current auxiliary power or alternating current auxiliary power. In some examples, the welding power supply further comprises an integrated wire feeder. In some example engine-driven welders, the welding power supply comprises a user interface configured to receive first inputs to control welding parameters. Some such examples further include a secondary interface attached to the chassis, where the secondary interface receives second inputs to control the welding parameters. In some such examples, the welding power supply enables the user interface and disables the secondary interface when the welding power supply is separated from the chassis.

Some example engine-driven welders further include an auxiliary power converter circuit coupled to the generator and configured to generate at least one of alternating current auxiliary power or direct current auxiliary power, where the chassis holds the auxiliary power converter circuit. In some examples, the welding power supply includes an output foldback circuit to reduce a load on the generator by the welding power supply. In some such examples, the output foldback circuit reduces the load on the generator in response to detecting a decrease in engine speed.

Some examples further include a power supply mount to securely attach the welding power supply to the chassis and to enable detachment of the welding power supply from the chassis. In some examples, the welding power supply is connected to an auxiliary power output of the generator. In some examples, the chassis comprises a roll cage configured to protect the engine and the generator.

In some example engine-driven welders, the welding power supply includes an output receptacle to output at least a portion of the electric power as auxiliary power. Some examples further include a circuit breaker coupled to the auxiliary power to disable the auxiliary power when the auxiliary power exceeds a threshold current. In some examples, the welding power supply has a net weight less than 51 pounds. In some examples, the welding power supply has a net weight less than 31 pounds. In some example engine-driven welders, the welding power supply is hard wired to terminals, which are connected to the generator via at least a current limiting device.

Figure 1:
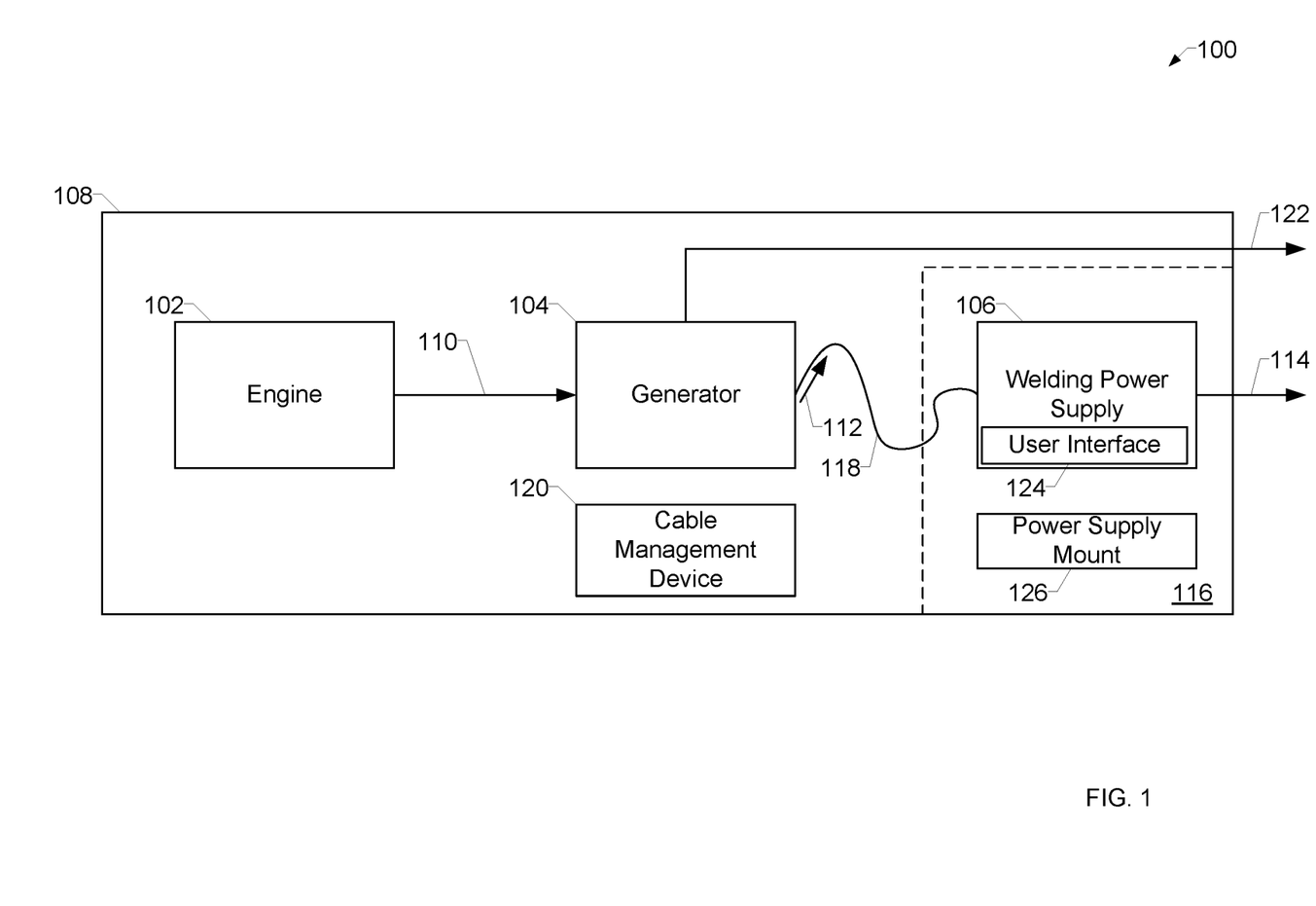
FIG. 1 is a block diagram of an example engine-driven welder with a portable welding unit, in accordance with aspects of this disclosure.

FIG. 1 is a block diagram of an example engine-driven welder 100 with a portable welding unit. The engine-driven welder 100 of FIG. 1 provides welding-type power and/or auxiliary electric power (e.g., general-use AC and/or DC power).

The engine-driven welder 100 includes an engine 102, a generator 104, a welding power supply 106, and a chassis 108. The engine 102 may be an internal combustion engine, and generates mechanical power 110. The generator 104 receives the mechanical power 110 from the engine 102 and converts the mechanical power 110 to electric power 112. In some examples, the chassis 108 includes a roll cage.

The welding power supply 106 is a portable welding unit that receives the electric power 112 from the generator 104 and converts the electric power 112 to welding-type power 114. The welding power supply 106 may include an integrated wire feeder to provide wire electrode to a welding operation. The welding power supply is physically separable from the chassis, and The engine 102 and the generator 104 are mounted to the chassis 108. The chassis 108 is also configured to physically hold the welding power supply 106. However, in the example of FIG. 1, the welding power supply 106 is physically separable from the chassis 108 and the welding power supply 106 is connected to the generator so as to be able to receive the electric power 112 both when the welding power supply 106 is separated from the chassis 108 and when the welding power supply 106 is connected to (e.g., physically held by) the chassis 108. For example, the chassis 108 may be configured with a support structure 116 to hold the welding power supply 106, and the welding power supply 106 may be removed from the support structure 116. In some examples, the chassis 108 further includes a power supply mount 126 (e.g., a retaining device) to secure the welding power supply 106 but which enables an operator to easily detach the welding power supply 106. Example power supply mounts 126 may include clips, straps, friction-based and/or compression-based bushings, latches, and/or any combination thereof. In some other examples, screws, bolts, and/or more labor-intensive attachment devices may be used.

As illustrated in FIG. 1, the welding power supply 106 is coupled to the generator 104 via a cable 118 to deliver the electric power 112. The cable 118 is hard-wired to the generator 104 and to the welding power supply 106 to improve durability and resist stress on the cable 118 (e.g., with the appropriate stress relief installed). In some examples, the welding power supply 106 is coupled to terminals on the chassis 108 via the cable 118, which are in turn connected to a winding of the generator 104 via a current limiting device (e.g., a circuit breaker, a fuse, etc.), to receive the electric power 112.

The cable 118 delivers the electric power 112 as AC power. As a result, the cable 118 can be a high voltage extension cord type of cable instead of a high current weld cable, which reduces the cost of the cable 118 (e.g., replacement cost of the cable 118). The length of the cable 118 determines the maximum distance that the welding power supply 106 can be taken from the chassis 108.

The example chassis 108 includes a cable management device 120 to hold the cable 118 when the welding power supply 106 is set in the support structure 116 and/or when the welding power supply 106 is moved away from the chassis 108 less than the entire length of the cable 118. The cable management device 120 may be, for example, a cable reel or a cable winder.

The cable 118 may be replaceable. Alternatively, the cable 118 may be plugged into the generator 104 and/or the welding power supply 106 instead of hard-wired.

In addition to providing the electric power 112 via the cable 118, the generator 104 may output auxiliary power 122 as AC and/or DC power. In some examples, the generator 104 generates AC electric power (e.g., 120 VAC or 230 VAC at 50 Hz or 60 Hz, etc.), and an auxiliary power circuit converts the AC electric power to the auxiliary power 122.

As illustrated in FIG. 1, the welding power supply 106 includes a user interface 124 configured to receive first inputs to control welding parameters. The user interface 124 may include controls for one or more welding parameters (e.g., voltage, current, wire feed speed, etc.), displays to display the values of welding parameter(s), and/or any other inputs and/or outputs to the welding power supply 106.

Figure 2:
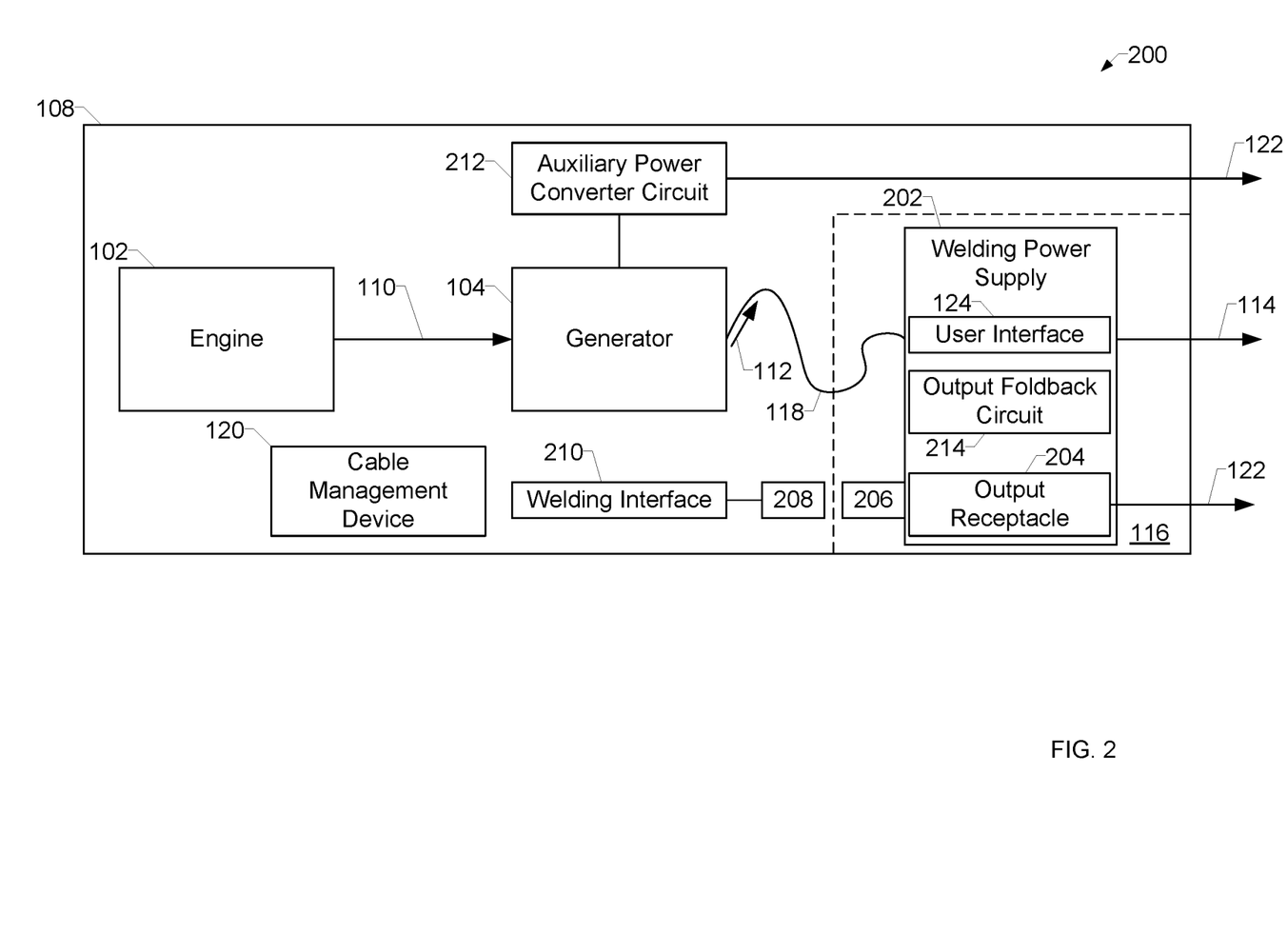
FIG. 2 is a block diagram of another example engine-driven welder with a portable welding unit, in accordance with aspects of this disclosure.

FIG. 2 is a block diagram of another example engine-driven welder 200 with a portable welding unit. The example engine-driven welder 200 of FIG. 2 includes the engine 102, the generator 104, a welding power supply 202, the chassis 108, and the cable management device 120. The welding power supply 202 includes the user interface 124.

In the example of FIG. 2, the welding power supply 202 also includes an output receptacle 204 and a connector 206. The engine-driven welder 200 also includes a connector 208 and a secondary interface 210. The secondary interface 210 may be similar to the user interface 124, and includes inputs to control one or more welding parameters (e.g., voltage and/or current set points, wire feed speed, welding modes, etc.). The secondary interface 210 may control the welding power supply 106 in conjunction with or instead of the user interface 124.

For example, when the welding power supply 202 is connected or attached to the support structure 116 of the chassis 108, the connector 206 mates with the connector 208 to put the user interface 124 into communication with the secondary interface 210. The connection between the user interface 124 and the secondary interface 210 may cause the secondary interface 210 to disable the user interface 124, thereby restricting control of welding (and/or control of the engine-driven welder 200 more generally) to the secondary interface 210. Conversely, when the welding power supply 202 is detached from the chassis 108 and the connector 206 is detached from the connector 208, the user interface 124 is enabled for control of the welding power supply 202. Additionally, the secondary interface 210 may be disabled from controlling the welding power supply 202 to avoid control of the welding parameters from a location remote from the welding power supply 202 (e.g., enhancing safety of the weld operator and/or preventing damage to the workpiece due to the weld operator not being aware of changes to the weld parameters).

The output receptacle 204 may provide another source of the auxiliary power 122, such as receptacle into which electric devices can be plugged to receive the auxiliary power 122 at a location remote from the chassis 108.

The example engine-driven welder 200 also includes an auxiliary power converter circuit 212 to convert the electric power 112 to the auxiliary power 122. For example, the auxiliary power converter circuit 212 may convert the electric power 112 from AC power having a first voltage and a first frequency to AC power having different frequencies and/or voltages, and/or to DC auxiliary power.

The example welding power supply 202 also includes an output foldback circuit 214. The output foldback circuit 214 reduces the load on the generator 104 by the welding power supply 202. For example, the output foldback circuit 214 may reduce the load in response to detecting a decrease in weld voltage from a commanded voltage by decreasing the voltage and/or current command at the welding power supply 202.

Figure 3:
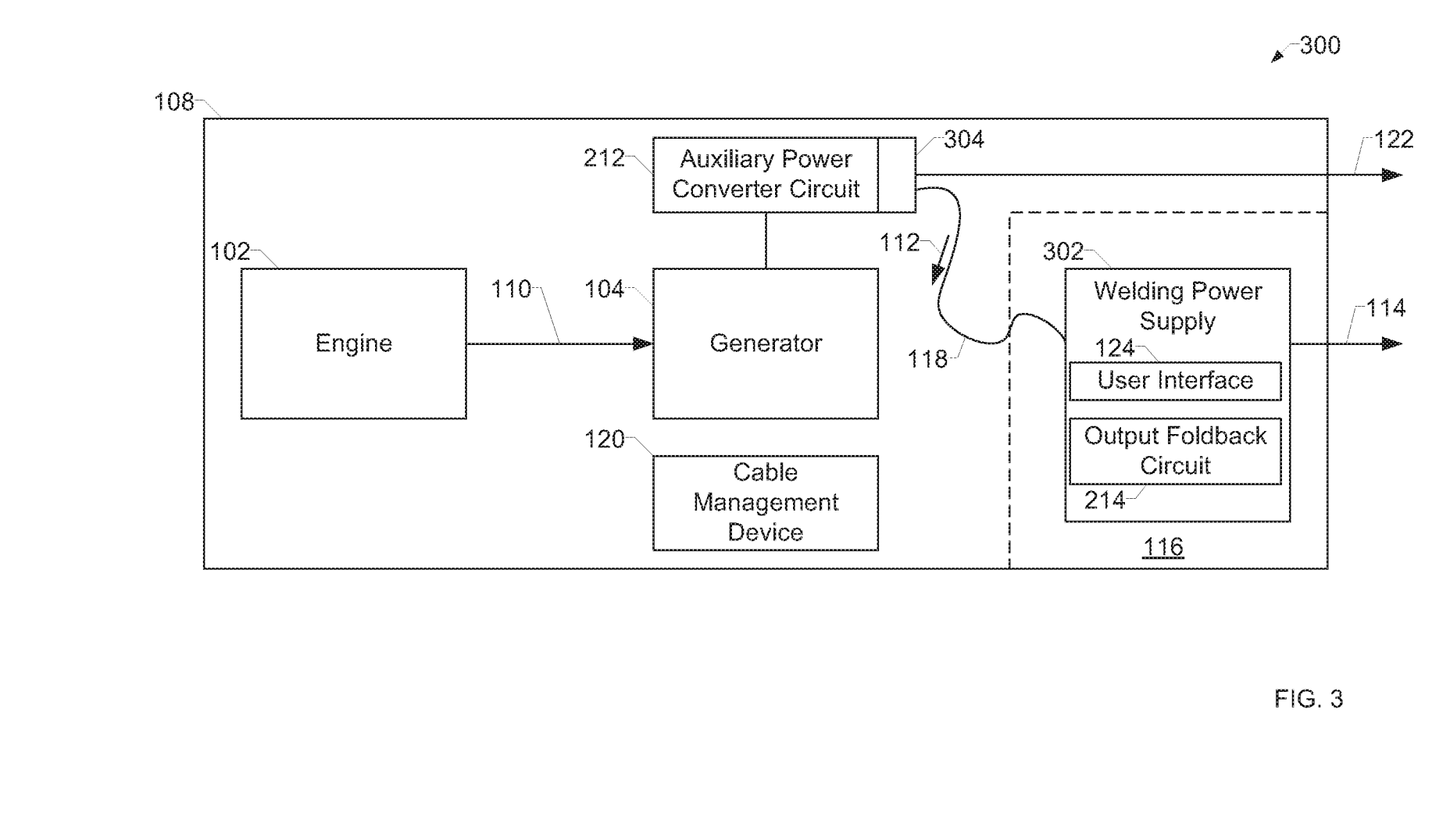
FIG. 3 is a block diagram of another example engine-driven welder with a portable welding unit, in accordance with aspects of this disclosure.

FIG. 3 is a block diagram of another example engine-driven welder 300 with a portable welding unit 302. The example engine-driven welder 300 of FIG. 2 includes the engine 102, the generator 104, a welding power supply 302 (e.g., the portable welding unit), the chassis 108, the cable management device 120, and the auxiliary power converter circuit 212. The welding power supply 202 includes the user interface 124 and the output foldback circuit 214.

In contrast with the examples of FIGS. 1 and 2, the welding power supply 302 of FIG. 3 is connected to an auxiliary power output of the generator 104. As illustrated in FIG. 3, the welding power supply 302 is connected to an auxiliary power receptacle 304. The welding power supply 302 may be plugged and/or unplugged from the auxiliary power receptacle 304.

Figure 4:
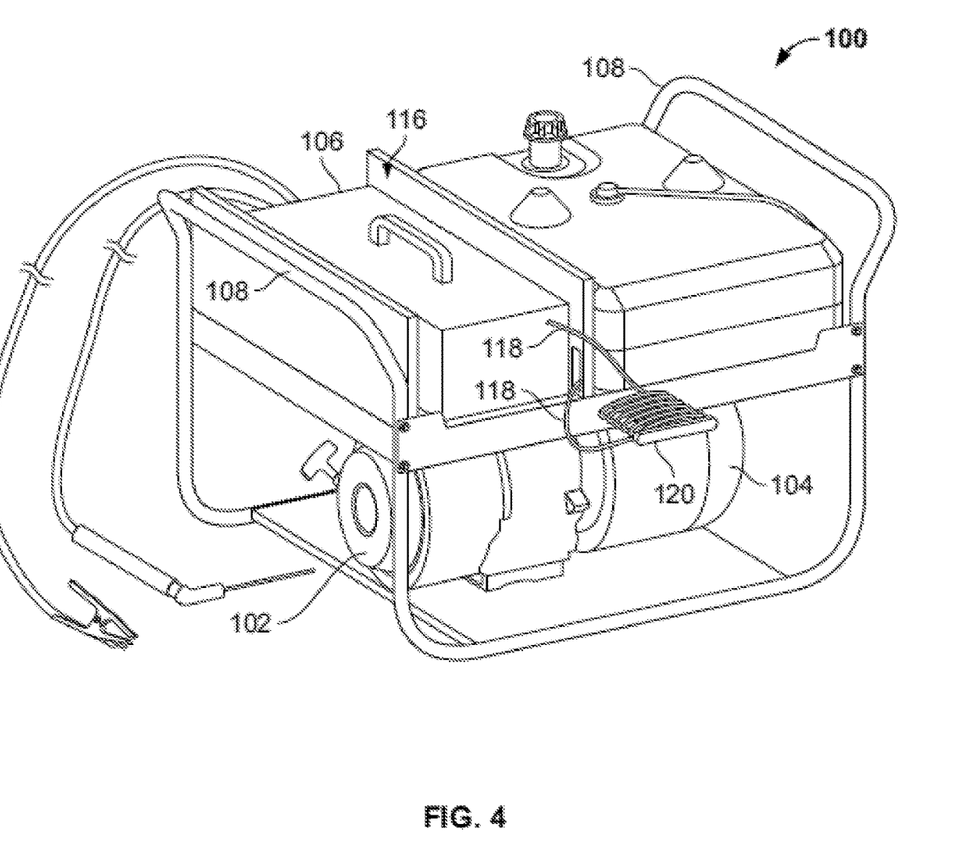
FIG. 4 illustrates an example implementation of the engine-driven welder of FIG. 1, in which the portable welding unit is attached to the chassis, in accordance with aspects of this disclosure.
Figure 5:
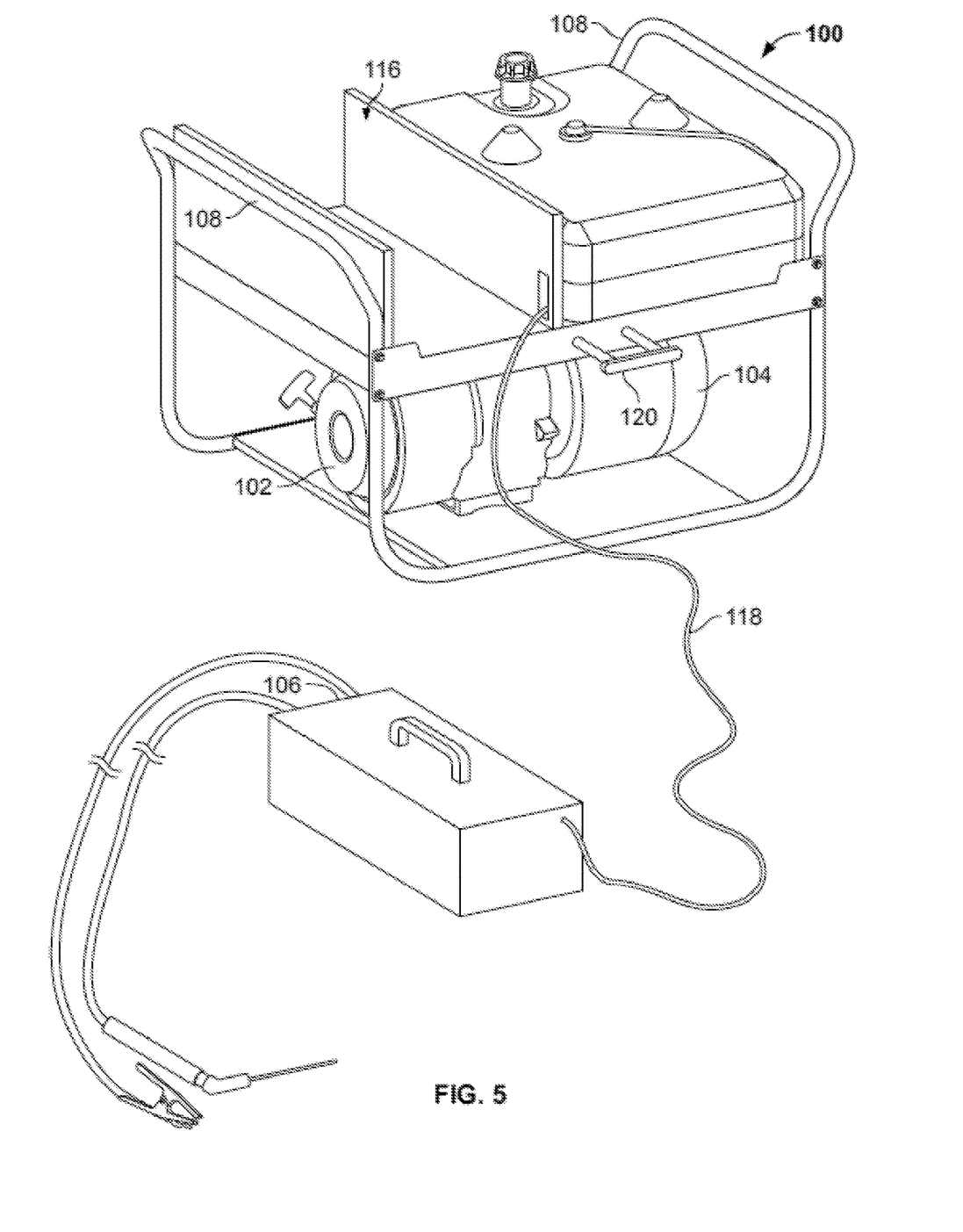
FIG. 5 illustrates an example implementation of the engine-driven welder of FIG. 1, in which the portable welding unit is attached to the chassis, in accordance with aspects of this disclosure.

FIG. 4 illustrates an example implementation of the engine-driven welder 100 of FIG. 1, including the chassis 108 and the portable welding unit 106 attached to the chassis 108. FIG. 5 illustrates an example implementation of the engine-driven welder 100 of FIG. 1, including the chassis 108 and the portable welding unit 106 detached from the chassis 108. As illustrated in FIG. 4, the portable welding unit 106 may be placed on or in the support structure 116 of the chassis 108. The support structure 116 provides one or more retention mechanisms. When the portable welding unit 106 is placed in or on the support structure 116, the cable 118 may be wrapped using the cable management device 120. Conversely, when the portable welding unit 106 is removed and taken to a location remote from the chassis 108, the cable 118 is unwound from the cable management device 120 and extends between the generator 104 and the portable welding unit 106.

The present methods and systems may be realized in hardware, software, and/or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise one or more processors, programmable logic circuits, application specific integrated circuits, and/or any other type of logic circuits and/or processing chips. Some implementations may comprise a non-transitory machine-readable (e.g., computer readable) medium (e.g., FLASH memory, optical disk, magnetic storage disk, or the like) having stored thereon one or more lines of code executable by a machine, thereby causing the machine to perform processes as described herein. As used herein, the term "non-transitory machine-readable medium" is defined to include all types of machine readable storage media and to exclude propagating signals.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. An engine-driven welder, comprising:
   an engine;
   a generator configured to convert mechanical power from the engine to electric power;
   a chassis comprising a power supply mount to securely attach one or more welding power supplies to the chassis and to enable detachment of the one or more welding power supplies from the chassis, the engine and the generator being mounted to the chassis; and
   a welding power supply including a housing, a handle, and a user interface, the welding power supply configured to receive the electric power from the generator and convert the electric power to welding-type power, wherein the welding power supply is removably secured to the chassis via the power supply mount and physically separable from the chassis, and the welding power supply is connected to the generator via a cable to be able to receive the electric power when the welding power supply is removed and physically separated from the chassis and when the welding power supply is secured to the chassis.

2. The engine-driven welder as defined in claim 1, wherein the welding power supply is coupled to a winding of the generator, via a cable, to receive alternating current.

3. The engine-driven welder as defined in claim 2, wherein the chassis includes a cable management device to hold the cable.

4. The engine-driven welder as defined in claim 3, wherein the cable management device comprises at least one of a cable reel or a cable winder.

5. The engine-driven welder as defined in claim 1, wherein the welding power supply comprises an auxiliary power converter to convert the electric power to at least one of direct current auxiliary power or alternating current auxiliary power.

6. The engine-driven welder as defined in claim 1, wherein the welding power supply further comprises an integrated wire feeder.

7. The engine-driven welder as defined in claim 1, wherein the user interface is configured to receive first inputs to control welding parameters.

8. The engine-driven welder as defined in claim 7, further comprising a secondary interface attached to the chassis, the secondary interface configured to receive second inputs to control the welding parameters.

9. The engine-driven welder as defined in claim 8, wherein the welding power supply is configured to enable the user interface and disable the secondary interface when the welding power supply is separated from the chassis.

10. The engine-driven welder as defined in claim 1, further comprising an auxiliary power converter circuit coupled to the generator and configured to generate at least one of alternating current auxiliary power or direct current auxiliary power, the chassis configured to hold the auxiliary power converter circuit.

11. The engine-driven welder as defined in claim 1, wherein the welding power supply comprises an output foldback circuit to reduce a load on the generator by the welding power supply.

12. The engine-driven welder as defined in claim 11, wherein the output foldback circuit is configured to reduce the load on the generator in response to detecting a decrease in engine speed.

13. The engine-driven welder as defined in claim 1, wherein the welding power supply is connected to an auxiliary power output of the generator.

14. The engine-driven welder as defined in claim 1, wherein the chassis comprises a roll cage configured to protect the engine and the generator.

15. The engine-driven welder as defined in claim 1, wherein the welding power supply comprises an output receptacle to output at least a portion of the electric power as auxiliary power.

16. The engine-driven welder as defined in claim 1, further comprising a circuit breaker coupled to the auxiliary power to disable the auxiliary power when the auxiliary power exceeds a threshold current.

17. The engine-driven welder as defined in claim 1, wherein the welding power supply has a net weight less than 51 pounds.

18. The engine-driven welder as defined in claim 1, wherein the welding power supply has a net weight less than 31 pounds.

19. The engine-driven welder as defined in claim 1, wherein the welding power supply is hard wired to terminals, which are connected to the generator via at least a current limiting device.

20. An engine-driven welder, comprising:
a chassis comprising:
a power supply mount to securely attach one or more welding power supplies to the chassis and to enable detachment of the one or more welding power supplies from the chassis; and
a roll cage configured to protect an engine and a generator, wherein the engine and the generator are mounted to the chassis; and
a welding power supply including a housing, a handle, and a user interface, the welding power supply configured to receive electric power from the generator and convert the electric power to welding-type power, wherein the welding power supply is removably secured to the chassis via the power supply mount and physically separable from the chassis, and the welding power supply is connected to the generator to be able to receive the electric power when the welding power supply is removed and physically separated from the chassis and when the welding power supply is secured to the chassis.

* * * * *